VESTIGIAL SIDE-BAND DETECTOR

Filed Nov. 23, 1951

3 Sheets-Sheet 1

INVENTOR
B. M. OLIVER
BY Hugh S. Wertz
ATTORNEY

June 22, 1954 B. M. OLIVER 2,681,988

VESTIGIAL SIDE-BAND DETECTOR

Filed Nov. 23, 1951 3 Sheets-Sheet 2

INVENTOR
B. M. OLIVER
BY Hugh S. Wertz
ATTORNEY

June 22, 1954 B. M. OLIVER 2,681,988

VESTIGIAL SIDE-BAND DETECTOR

Filed Nov. 23, 1951 3 Sheets-Sheet 3

INVENTOR
B. M. OLIVER
BY Hugh S. Wertz
ATTORNEY

Patented June 22, 1954

2,681,988

UNITED STATES PATENT OFFICE 2,681,988

VESTIGIAL SIDE-BAND DETECTOR

Bernard M. Oliver, Morristown, N. J., assignor to Bell Telephone Laboratories, Incorporated, New York, N. Y., a corporation of New York Application November 23, 1951, Serial No. 257,913

3 Claims. (Cl. 250—27)

This invention relates to signal detection circuits for transmission systems and more particularly to circuits for the detection of vestigial sideband signals.

The general advantages of vestigial sideband transmission are well recognized. By such transmission the band width necessary to accommodate the useful signal is reduced to approximately one half of that required with double sideband transmission.

However, hitherto the advantages of such transmission have been offset to a considerable extent by the difficulties encountered in the detection or recovery of the signal information. For relatively distortionless detection, it has been customary to generate a local carrier at the receiver to be used for heterodyning in the recovery of the modulation information. However, the adjustment of this local carrier is very critical not merely as to frequency but also as to phasing, and consequently complex equipment is usually necessary to insure the proper relationships.

For this and other reasons it would be desirable to detect or recover the modulating signal information without the need of a local carrier.

Accordingly an object of this invention is to attain the advantages of a local carrier in the detection of vestigial sideband transmission without the use of such a local carrier.

An object related thereto is to improve and simplify the distortionless detection of such selective sideband transmission.

Another object is to make available separately the direct and quadrature components of vestigial sideband signals.

These and related objects are realized in accordance with the invention in a vestigial sideband signal detector in which: the transmitted selective sideband amplitude modulated signal is applied to an envelope or amplitude modulation detector for deriving a signal which is a measure of the envelope of the transmitted signal; simultaneously the transmitted signal is applied to a limiter-discriminator or frequency modulation detector for deriving a phase measure of the modulation, which is thereafter supplied to suitable circuits for approximating a cosine function of this phase measure; and finally the product of this cosine function and the envelope measure is derived in a multiplying circuit for providing the detected output. In effect, there is provided an arrangement for greatly reducing the quadrature component in the signal obtained from an envelope detector so that a relatively undistorted output is obtained.

The invention will be better understood from the following more detailed description taken in connection with the accompanying drawings in which.

An amplitude modulated wave can be represented as a vector rotating at carrier frequency whose length varies in accordance with the modulation. The instantaneous amplitude of the wave at any time is then given by the projection of the tip of this vector on some appropriately chosen axis. If the modulation is sinusoidal, the rotating vector can be resolved into three vectors of constant length rotating at different speeds. One of these represent the carrier, the other two the upper and lower side frequencies. For example, suppose the modulated wave is given by $$e=E_0(1+m \sin \omega_m) \cos \omega_c t \qquad (1)$$

where $e$ is the instantaneous amplitude of the wave,
$E_0$ is the peak carrier amplitude,
$m$ is the modulation coefficient,
$\omega_c$ is the carrier frequency, and
$\omega_m$ is the modulation frequency.

Figure 1:
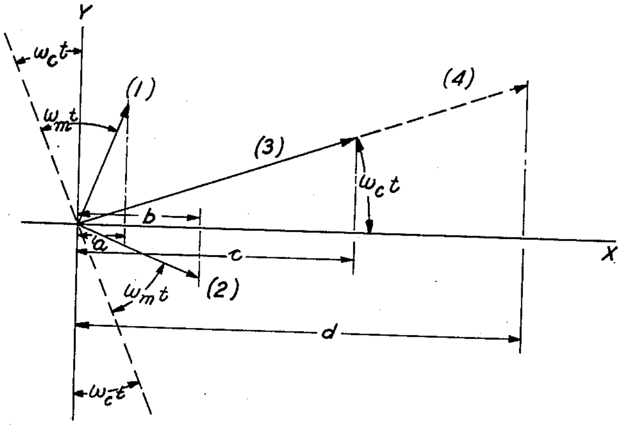
Figs. 1 and 2 are vector diagrams to aid in the explanation of the invention.

By simple trigonometric substitution, Equation 1 can be written as $$e=E_0\frac{m}{2} \sin(\omega_c-\omega_m)t+E_0 \cos \omega_c t E_0\frac{m}{2} \sin (\omega_c+\omega_m)t \qquad (2)$$

in which the first term represents the lower sideband component, the second the carrier component, and the third the upper sideband component. In Fig. 1 there is shown a vector diagram which illustrates the various relationships. The vector 1 is of length $$\frac{m}{2}E_0$$

and rotates at the angular velocity $(\omega_c-\omega_m)$ and its projection $a$ on the real axis is of length $$\frac{m}{2}E_0 \sin (\omega_c-\omega_m)t$$

which is the first term of Equation 2 and represents the lower sideband component. Similarly, the vectors 2 and 3 represent the carrier and upper sideband components, rotating at angular velocities $\omega_c$ and $\omega_c+\omega_m$, and having projections on the real axis, $b$ and $c$, of lengths $E_0 \cos \omega_c t$ and $$\frac{m}{2}E_0 \sin (\omega_c+\omega_m)t$$

respectively. The vector 4 is the vector sum of vectors 1, 2, and 3 and its projection $d$ is of length $E_0 (1+m \sin \omega_m t) \cos \omega_c t$ which is $e$ as given by Equation 1. It will be noted that the projection $d$ is the sum of projections $a$, $b$ and $c$.

Vector 4 is the resultant rotating vector, representing the entire modulated wave. Its length varies sinusoidally, and it rotates at the constant velocity $\omega_c$ in phase with the carrier vector. Therefore, it is seen that the sideband components add to the carrier component to produce pure amplitude modulation and zero frequency or phase modulation.

If the modulation is a complex wave, there will be a pair of vectors 1 and 2 for each frequency component of the modulation. The ensemble of vectors 1 can be combined to form a resultant modulation vector A, of length $$\frac{M}{2}$$

and the ensemble of vectors 2 combined to form a resultant modulation vector B of length $$\frac{M}{2}$$

The vectors A and B will be symmetrically disposed with regard to the carrier vector since each of their component parts are so disposed. In the vector diagram of Fig. 2, there are drawn the vectors A and B, the carrier vector C, and the resultant vector D. For purposes of simplicity, the the vectors are drawn for a time when the quantity $\cos \omega_c t=1$. Since vectors A and B are themselves the resultants of numerous sinusoidal components, the length M and the phase angle $\phi$ will both be functions of time. The instantaneous modulating amplitude $e_m$ is equal to $M \sin \phi$. In double side-band transmission, the carrier vector of length $E_0$ and both modulation vectors of length $$\frac{M}{2}$$

will be present. When the resultant wave is applied to a conventional envelope detector, there is derived an output amplitude equal to the vector D which is the sum of $E_0$ and $e_m$, or the sum of $E_0$ and $M \sin \phi$.

Figure 2:
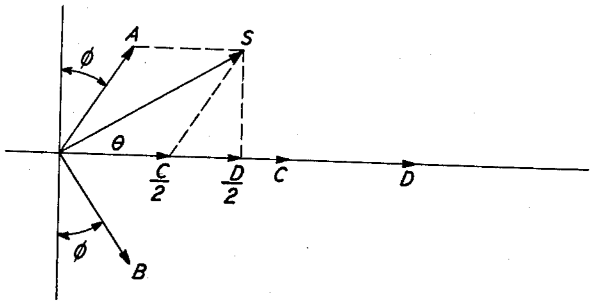

However, in vestigial sideband transmission to which the present invention is directed, one of the vector components, A or B, is suppressed by appropriate filters. For the sake of analysis, it will be supposed that the upper sideband component B is removed and that the lower sideband A is transmitted along with the carrier C which is reduced to half amplitude as is characteristic in selective transmission systems of this kind. This case is also illustrated in Fig. 2. The signal transmitted is represented by the vector S which is the sum of vectors A and $$\frac{C}{2}$$

If this signal is applied to a conventional envelope detector there will be derived an output equal to the magnitude of S. If S were equal to a constant times D, the output would still be undistorted. However, since S is related to D as a function of the modulated angle $\theta$ between the resultant S and the carrier vector $$\frac{C}{2}$$

the ratio S/D will be a function of time since $\theta$ is a function of time. It will be seen that the quantity $S \cos \theta = D/2$, so that the quantity $S \cos \theta$ is an undistorted measure of the modulation. The qantity $S \cos \theta$ is customarily called the "direct" or in-phase component, and the quantity $S \sin \theta$ the "quadrature" component in selective sideband transmission. For the recovery of the modulating intelligence, it is necessary to isolate the $S \cos \theta$ component of the transmission. In accorance with the present invention, these relationships are utilized for deriving the modulation directly from the transmitted signal. To this end, there is derived an approximation of the quantity $S \cos \theta$ which provides a measure of the desired in-phase modulation component of the selective sideband transmission.

Figure 3:
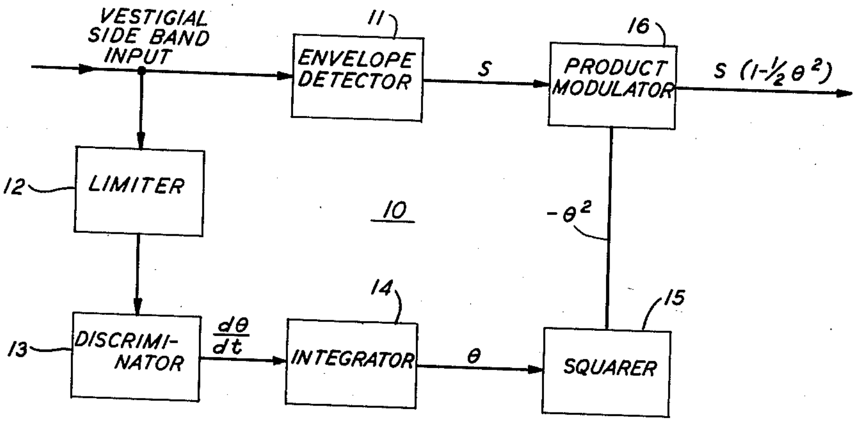
Fig. 3 is a block schematic of a detector in accordance with the invention for deriving the direct components of vestigial sideband signals.

In Fig. 3, there is illustrated in block schematic an exemplary embodiment of a detector arrangement 10 for recovering the desired modulation. The vestigial sideband signal input whose frequency characteristic, as is customary in transmission of this kind, is reduced to half amplitude at the carrier frequency and falls off at frequencies to one side of the carrier frequencies in the same way as it rises for frequencies on the other side of the carrier, is supplied simultaneously to an envelope detector 11 which provides a measure of the envelope S and to a limiter 12. The output of limiter 12 will be a series of rectangular waves whose times of cross-over are the times at which the input signal is zero, i. e., when vector S in Fig. 2 is perpendicular to the real axis. The intercepts of the wave out of the limiter are thus advanced or retarded by the time $$\frac{\theta}{\omega}$$

and the output wave is phase modulated. The wave out of the limiter 12 is thereafter supplied to a frequency-modulation type discriminator 13 to derive an output proportional to $$\frac{d\theta}{dt}$$

This output is applied to the integrating means 14 to provide a signal which is a measure of $\theta$. As is well known, $\cos \theta$ can be closely approximated by $1-k\theta^2$ (where $k$ is about ½) for values of $\theta$ up to about one radian. To derive this approximation, the signal which is a measure of $\theta$ is applied to the squarer 15, whose output is then a measure of $-\theta^2$. This signal, appropriately adjusted in magnitude and including the proper D.-C. term, is applied to the product modulator 16 which has supplied as its other input the output S of the envelope detector. Thus, the output of the product modulator can be made to consist of the quantity $$S\left(1-\frac{\theta^2}{2}\right)$$

which, as noted above, is a good approximation to $S \cos \theta$, the desired modulation.

Figure 4:
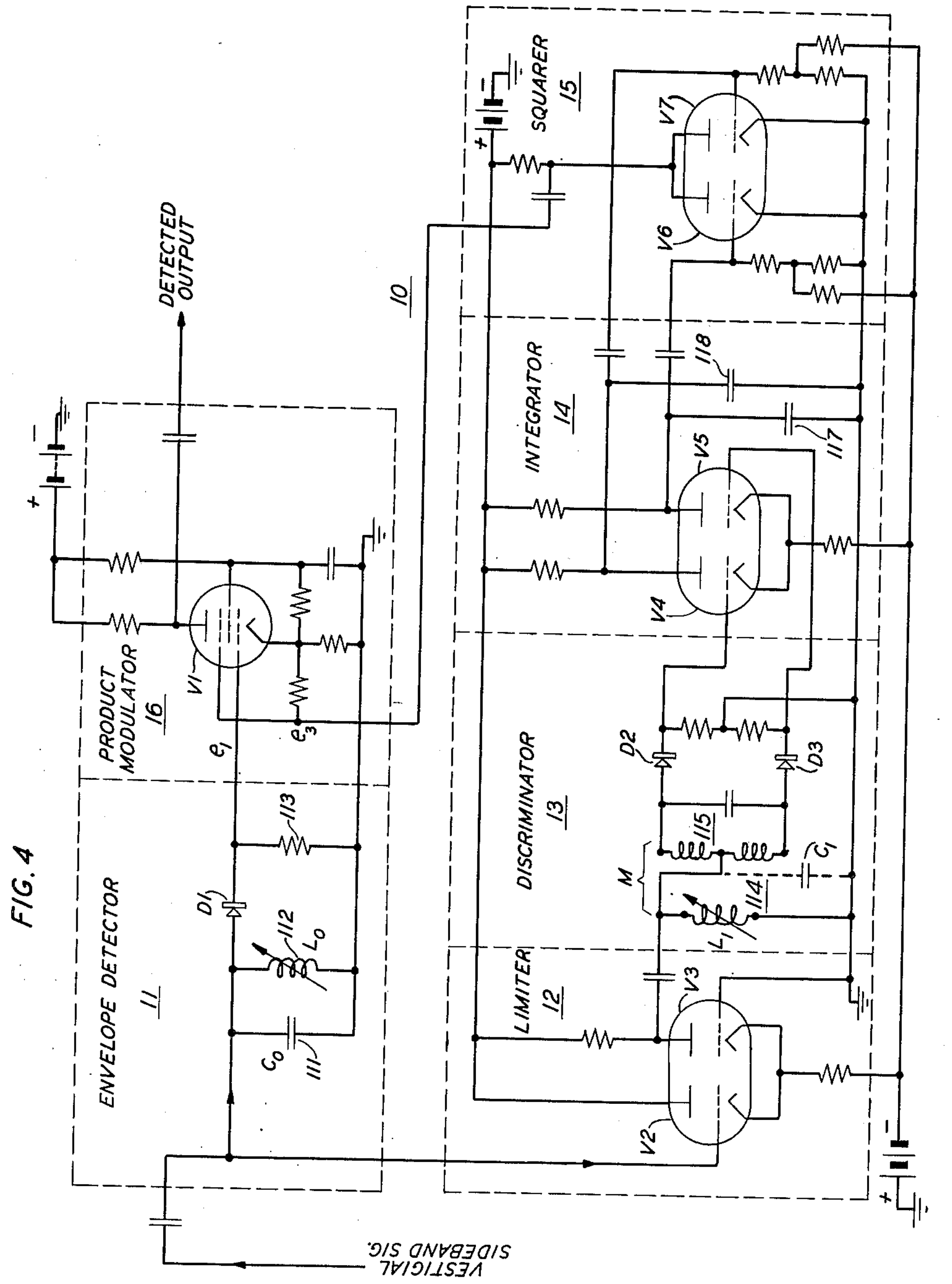
Fig. 4 is an illustrative circuit schematic of the detector of Fig. 3.

The various elements shown in block form in Fig. 3 are all elements known hitherto in the prior art. Accordingly, for purposes of simplicity, a detailed description of particular forms of these elements appears unwarranted. However, by way of illustration, there is shown in Fig. 4 a schematic of a circuit arrangement in which the various elements are interconnected as described above.

The input signal is applied to the envelope detector 11 comprising the unilateral conducting element D1 and its associated circuitry including the capacitance 111, inductance 112 and resistance 113, and there is derived therefrom an output which is a measure of the envelope S of the transmitted signal. This, in turn, is applied to the control grid of tube V1 which is operated as a suppressor-grid-modulated amplifier which, with its associated circuitry, serves as the product modulator 16. Simultaneously, the input signal is applied to the limiter 12 which includes tubes V2 and V3 and associated circuitry and then to the discriminator 13 which comprises essentially the two coupled resonant circuits 114 and 115 and the two unilateral conducting elements D2 and D3. The limiter and discriminator function as in a conventional frequency modulation detector and there becomes available, as the difference in voltage between the output terminals of elements D2 and D3, an output which is a measure of the frequency modulation of the applied signal, which in this case will be $$\frac{d\theta}{dt}$$

To utilize this, output terminals of elements D2 and D3 are connected, respectively, to the control grids of tubes V4 and V5 which together form a differential amplifier whose output is the difference of the two voltages applied to the tube control grids. The plate currents in tubes V4 and V5 will contain (in opposite polarity) currents which are a measure of $$\frac{d\theta}{dt}$$

Eachof these currents is integrated separately by the associated integrating capacitances 117 and 118. The integrated output voltages, which are a measure of $\theta$, derived thereacross are then applied to the squaring circuit 15 which comprises essentially the tubes V6 and V7. For the desired squaring function, the control grids of tubes V6 and V7 are operated in push-pull while their anodes are connected in parallel. With this mode of operation, only even order harmonics appear in the output, and, in fact, by suitable choice of an operating point on the anode current characteristic, the amplitude of the instantaneous output can be made to consist substantially of the square of the amplitude of the input wave applied to either grid, superimposed on a D.-C. component. When the tubes are operated in the square law region of the anode current characteristic in this way, the resultant output is a measure of the quantity $\theta^2$, or is related to $\alpha-\beta\theta^2$, where $\alpha$ is a D.-C. component and $\beta$ a gain factor, both of which are determined by the operating characteristics. This output is then applied to the suppressor-grid-modulator V1 which acts as a multiplier. By suitable choice of the operating conditions of tubes V1, V6, and V7, and the transmission path of the $\theta^2$ signal, the product output of tube V1 can be made $$S\left(1-\theta^2\right)$$

or to a good approximation $S \cos \theta$, which represents the desired in-phase component of the transmitted signal.

It can be seen that the detector arrangement described is independent of the characteristics of the filter used to suppress the undesired sideband so long as the attenuation provided thereby falls off at frequencies on one side of the carrier frequency as fast as it rises for frequencies on the other side of the carrier frequency because of the complementary functions of the two paths of the detector. The less dissymmetry there is between the sidebands, the smaller will be $$\frac{d\theta}{dt}$$

and, consequently, the smaller the contribution of the $\theta$ path, so that less correction is applied to the signal from the S path. Moreover, even in the limiting case of double sideband transmission, the circuit will function to provide the desired signal information. In this case, $$\frac{d\theta}{dt}$$

will be zero throughout, and accordingly the $\theta$ path will make no contribution and the detected output will be merely the envelope of the input signal as it should be double sideband input. Furthermore, it is unnecessary to provide D.-C. transmission in the $\theta$ path since in any vestigial sideband system the sideband dissymmetry disappears as the modulation frequency approaches zero. For very low frequencies, therefore, no correction is necessary via the $\theta$ path.

Figure 5:
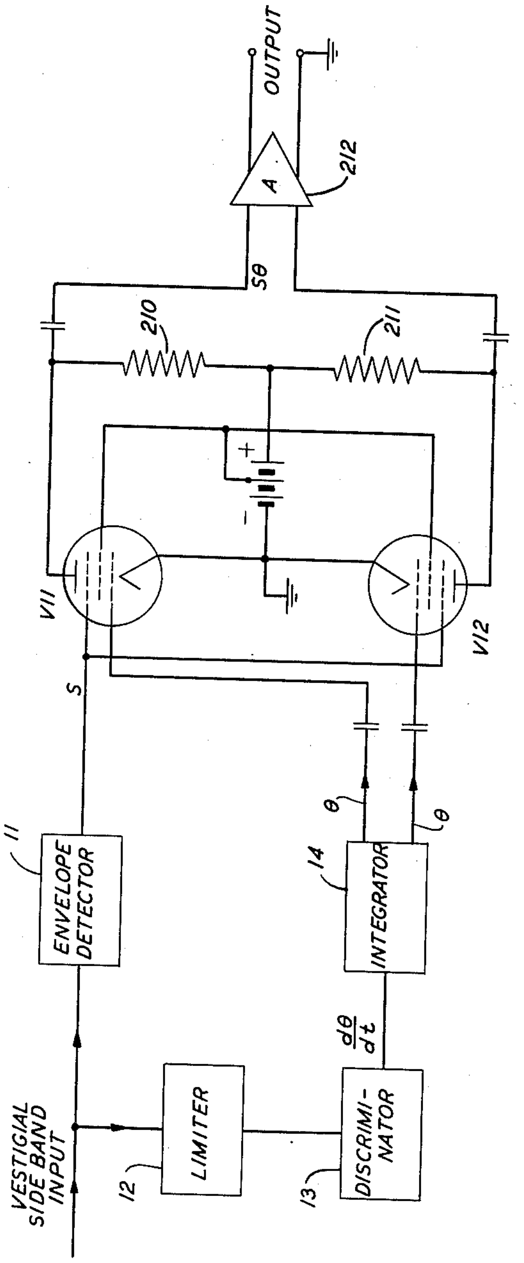
Fig. 5 shows, partly in block and partly in circuit schematic form, a detector in accordance with the invention for deriving the quadrature components of vestigial sideband signals.

It will also be seen that a system of the type shown in Fig. 3 can be modified to give an output $S\theta$, which for small values of $\theta$, is approximately equal to $S \sin \theta$ or $M \sin \theta$, which is the quadrature component of modulation. Fig. 5 shows an illustrative detector of this sort. Here, the squarer 15 employed in the circuit of Fig. 3 is omitted and the product modulator 16 used there is replaced by a balanced type of product modulator. As is shown, the integrated output voltages, which are a measure of $\theta$, derived across integrating capacitances, as for example the capacitances 117 and 118 of the detector shown in Fig. 4, are applied in push-pull to the control grids of tubes V11 and V12. Additionally, the anodes of tubes V11 and V12 are connected in push-pull. To provide multiplication as desired, the output derived from the envelope detector 11 and which is a measure of the values of S is applied to the suppressor grids of each of tubes V11 and V12 and accordingly, these results across the output resistances 210 and 211 a signal which is a measure of $S\theta$ and which represents the quadrature component of modulation as desired. The balanced product modulator in this schematic is preferably followed by a differential amplifier 212 which by its differential action amplifies the desired signal which appears as the differences of the two voltages on the anodes of tubes V11 and V12 and at the same time suppresses undesired modulation products which appear as potential differences between either anode and ground.

It is to be understood that the above-described arrangement is merely illustrative of the general principles of the invention. Other arrangements can be devised by one skilled in the art without departing from the spirit and scope of the invention.

What is claimed is:

1. In a circuit for detection of the modulating intelligence in a selective sideband signal, means supplied with a selective sideband signal for detecting a measure of the envelope of said signal, circuit means supplied with the selective sideband signal for detecting a measure of the modulation angle of the signal, circuit means supplied with the measure of the modulation angle of the signal for deriving a measure of the cosine of the modulation angle, and circuit means supplied with measures of the envelope and cosine of the modulation angle of said signal for obtaining an output which is a measure of the modulating intelligence in said signal.

2. In a selective sideband system, a source of a selective sideband signal, amplitude-sensitive means supplied by said source for obtaining a measure of the envelope of said signal, phase-sensitive means supplied by said source for obtaining a measure of the modulation angle of the signal, circuit means including a squaring circuit supplied with the measure of the modulation angle of the signal for deriving a measure of the cosine of the modulation angle, and a multiplying circuit supplied with measures of the envelope and cosine of the modulation angle of the signal for obtaining a measure of the signal information of said signal.

3. A circuit for detecting the modulation intelligence in a selective sideband signal comprising envelope-sensitive means to be supplied with the signal for providing an envelope measure of the signal, phase-sensitive means to be supplied with the signal for providing a measure of the frequency modulation in the signal, integrating means supplied with the measure of the frequency modulation in the signal for providing a measure of the modulation angle of the signal, means including a squaring circuit supplied with the measure of the modulation angle of the signal for providing substantially a measure of the cosine of the modulation angle of the signal, and multiplying means supplied with the envelope measure of the signal and the measure of the cosine of the modulation angle of the signal, for providing the modulation intelligence.

References Cited in the file of this patent

UNITED STATES PATENTS

| Number | Name | Date |
| --- | --- | --- |
| 2,377,326 | Crosby | June 5, 1945 |